Figure 1:
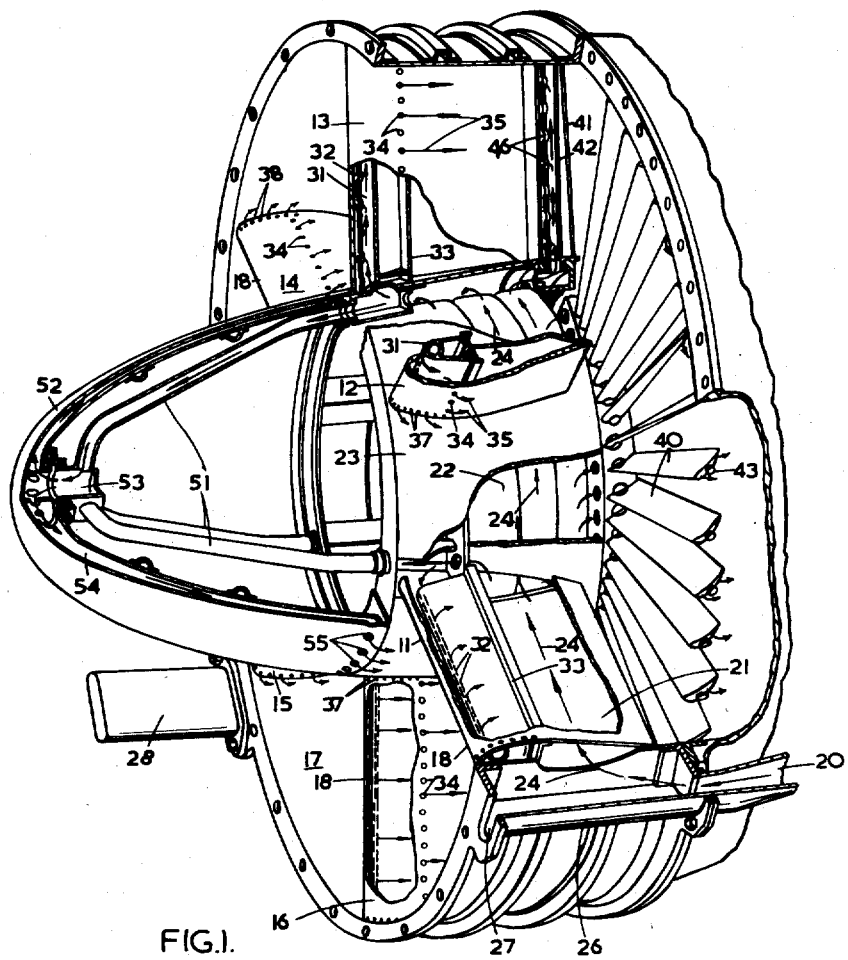

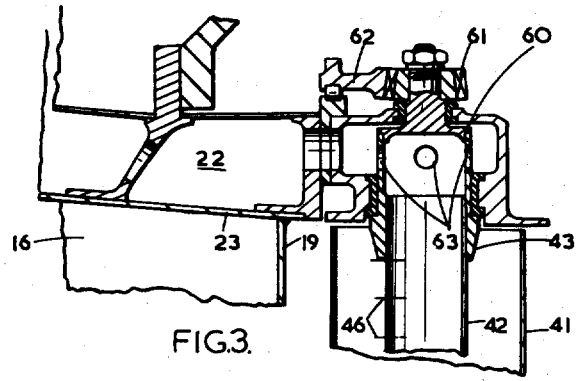
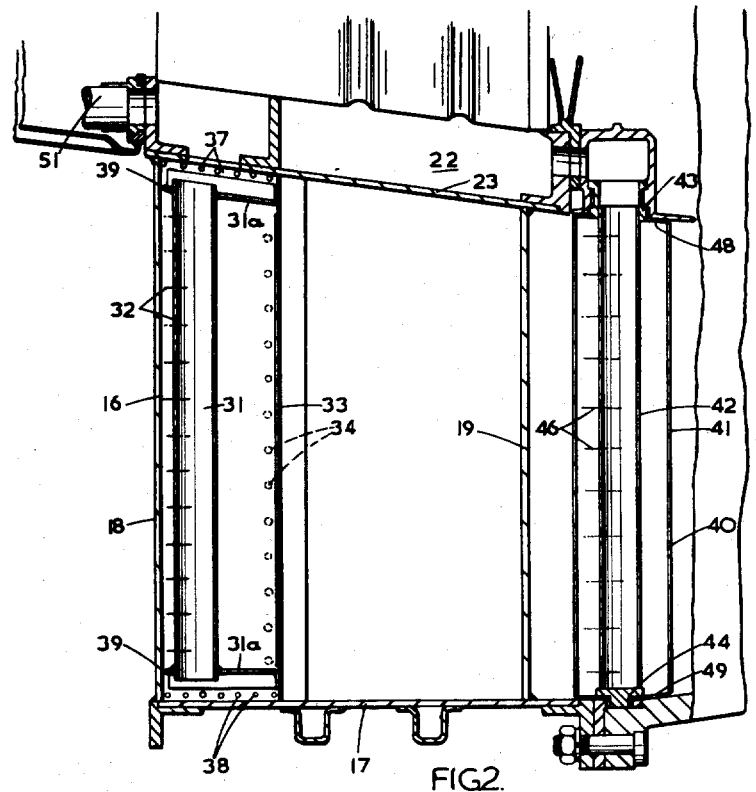

United States Patent Office 2,927,725
Patented Mar. 8, 1960

2,927,725
ANTI-ICING MEANS FOR A GAS TURBINE ENGINE OF AN AIRCRAFT

Horace S. Rainbow, Coventry, England, assignor to Armstrong Siddeley Motors Limited, Coventry, England Application June 29, 1954, Serial No. 440,195

Claims priority, application Great Britain July 3, 1953

9 Claims. (Cl. 230—132)

This invention relates to anti-icing means for a gas turbine engine, of an aircraft, having an axial-flow compressor, the main object being to prevent icing-up of the engine with a minimum expenditure of hot gaseous fluid.

Various arrangements have been proposed in the past, but in these the tendency was for the hot gaseous fluid to be distributed rather indiscriminately. A more specific object of the invention is to distribute the hot gaseous fluid only to the most essential places, thus to economize in the use of the fluid.

According to the invention, hot gaseous fluid is fed to an internal chamber at the intake end of the engine, preferably inwardly along the rearward portion of at least one of the intake webs or spokes, and is delivered from the internal chamber to the inner surfaces of the forward edges of all the intake spokes, to the interiors of all the adjacent inlet guide vanes of the compressor, and to the interior surface of the nose bullet of the latter.

In the accompanying drawings:

Figure 1 is a part-sectional perspective view of the inlet end of an axial-flow compressor of a gas turbine engine arranged according to the invention, with some of the intake spokes broken away at different levels;

Figure 2 is a sectional elevation of one of the intake spokes, hereinafter referred to as spoke 16, and of one of the inlet guide vanes; and Figure 3 is a fragmentary sectional elevation, to a larger scale than that of Figure 2, showing a portion of a modification of the aforesaid internal chamber, and showing also the radially-inner end of a modified form of one of the inlet guide vanes which is an adjustable one.

Like reference numerals are used throughout the drawings, however, to denote corresponding parts.

In the construction shown by Figures 1 and 2, there are six intake spokes, marked 11–16, mounted within the external intake casing 17 of the compressor. As shown in Figure 2, the forward edge of the spoke is designated 18, and the trailing edge 19.

There is at least one conduit 20 supplied at its inlet end (not shown) with gaseous fluid at an appropriate temperature, the outlet end (shown in Figure 1) of the conduit communicating with an internal passage 21 provided along the rear portion of one of the spokes (spoke 11 in the present instance). The internal passage 21 leads to the aforesaid annular internal chamber 22 within the internal intake casing 23 of the compressor. The arrows 24 show the course taken by the hot gaseous fluid into and in the internal chamber 22. The chamber 22 is supported by the spokes and itself supports the nose bullet hereinafter described.

In the case of a compound engine or other engine in which the temperature of the air at the outlet from the compressor (the high pressure section in the case of a compound engine) reaches a sufficiently high value—for example, 350° C.—the hot gaseous fluid may be this air. In other conditions heat may be added to the output of the compressor, as will be well understood.

Figure 1 shows the outlet end of the conduit 20 as communicating with a collecting chamber in a casing 26 from which the gaseous fluid travels inwardly along the internal passage 21 to the internal annular chamber 22. An opening 27 (Figure 1) at the upstream end of the collecting chamber is provided to receive an extension, such as that marked 28, when this is required. That is to say, the extensions may provide port and starboard points for heating the lip (not shown) of the intake duct. Obviously, however, the opening 27 can be blanked off when not required.

In practice, it is preferred that at least two conduits, such as that marked 20, should be arranged respectively to supply hot gaseous fluid along the interiors of two different spokes to the internal annular chamber 22. In the present instance, not only is the spoke 11 used in this way, but, in addition, the spoke 15, of which only a very small fragment of the radially-outer end appears in Figure 1, is intended to be so used.

Internally of the forward portions of each of the intake spokes is arranged an axially-extending tube 31 (i.e., tubes extending radially of the engine) the inner ends of which communicate with the internal chamber 22 and which are perforated at 32 so as to direct the hot gaseous fluid against the adjacent front walls 18 of the spokes, in order to provide for even heat distribution over the leading edges of the spokes. Lengthwise behind each tube is disposed a baffle 33 to box in the forward portion of the spoke, the hot gases finally exhausting through holes 34, all as shown by the arrows 35, provided on opposite sides of the spokes just in advance of the baffles. Small holes 37, 38 at the inner and outer ends of the spokes respectively allow a portion of the gaseous fluid to exhaust over the ends of all the spokes in order to prevent the occurrence of "cold spots" at these areas. Supports 31a for the tube 31 provide gaps 39 adjacent the edge 18, also for preventing "cold spots" in these areas.

In a rather similar manner, the rear end of the internal chamber 22 is connected to supply hot air to the interiors of all the inlet guide vanes 40. The latter are of fabricated construction, formed and shaped from sheet metal. In Figures 1 and 2 each comprises an outer shell 41 of the required aerodynamic shape, an inner flow-control baffle or tube 42, and attachments 43, 44 brazed to both ends of the vane to provide inner and outer locations. The gaseous fluid flows to the inner ends of the tubes, and, by means of suitably arranged slots, indicated at 46, along the front edges of the tubes 42, it is caused to flow over the inner surface of each outer shell 41, being finally exhausted into the compressor inlet through small gaps 48, 49 arranged between the ends of vanes and the inner (23) and outer (17) parts of the intake casing respectively.

In Figure 3, the attachment 43 is extended at 60 and is provided with a gear 61 meshing an annular gear 62 by which the blade can be rotated as a whole, the extension 60 having holes 63 through which the gaseous fluid is admitted to the interior of the tube 42.

Furthermore, the hot gaseous fluid is carried from the internal chamber 22, as by means of three symmetrical pipes 51 within the nose bullet 52, to a junction chamber 53 at the front end of the latter, from which it flows along an inner annular space 54, exhausting to atmosphere through holes 55 in the downstream end of the bullet.

It is found that these are the essential surfaces of a gas turbine engine, having an axial flow compressor, which have to be heated to prevent ice accretion; and by confining the supply of hot gaseous fluid to these surfaces the gaseous fluid is used very economically.

What I claim as my invention and desire to secure by Letters Patent of the United States is:

1. An anti-icing system, for an aircraft gas turbine engine comprising an axial flow compressor, the system including, upstream of the compressor, hollow air intake spokes, hollow air inlet guide vanes, and a hollow nose bullet, said intake spokes having forward edges and being upstream of said guide vanes but downstream of said nose bullet, respective tubes within said intake spokes, said tubes being parallel with said forward edges of said spokes and spaced therefrom, said tubes provided with lateral holes facing said forward edges, an internal distributor casing supported by the intake spokes, said distributor casing supporting the nose bullet and the guide vanes and providing a chamber to which hot gases are delivered, the distributor casing having a first communication with said tubes so as to provide for the flow of hot gases from the chamber and through said holes of said tubes on to the inner surfaces of the forward edges of all the intake spokes, the distributor casing having a second communication with the interiors of said inlet guide vanes so as to provide for the simultaneous flow of hot gases from the chamber to the interiors of the inlet guide vanes, and the casing being connected by at least one pipe to the hollow nose bullet, the pipe providing for the simultaneous flow of hot gases from the distributor casing to the interior surface of the nose bullet, whereby the hot gases delivered to the chamber in the distributor casing are simultaneously distributed in parallel paths directly to the interiors of the intake spokes, guide vanes, and nose bullet.

2. A system according to claim 1, and including a tube provided along the interior of each intake spoke and connected at their radially inner ends to receive hot gaseous fluid from said distributor chamber, said tubes having openings by which the hot gaseous fluid is directed against the internal forward edges of the intake spokes.

3. A system according to claim 2, and in which each guide vane has clearance at its ends from the support for the guide vane, thus allowing the escape of the gaseous fluid used for heating the guide vane to exhaust into the compressor inlet.

4. A system according to claim 1, and including a junction chamber within the nose bullet at the upstream end thereof, and separate pipes communicating with the junction chamber to supply hot gaseous fluid thereto in parallel from different portions of said distributor chamber, said junction chamber having openings in the wall thereof by which the hot gaseous fluid is directed against the internal surface of the nose bullet.

5. A system according to claim 4 and in which the nose bullet has an internal sheath spaced from the nose bullet to provide a curved annular space for the hot gaseous fluid, the nose bullet having outlet openings at its downstream end through which the hot gaseous fluid will exhaust into the compressor intake.

6. In an aircraft gas turbine engine with an axial flow compressor, an anti-icing system comprising hollow air intake spokes, hollow air inlet guide vanes, a hollow nose bullet, and a junction chamber within said nose bullet at the upstream end thereof, the intake spokes being upstream of the guide vanes but downstream of the nose bullet, said intake spokes having forward edges, a respective tube within each said intake spoke, said tubes being parallel with said forward edges of said spokes and spaced therefrom, said tubes provided with lateral holes facing said forward edges, an internal distributor casing supported by the intake spokes, said distributor casing supporting the nose bullet and the guide vanes and providing a chamber to which hot gases are delivered, the distributor casing having a first communication with said tubes so as to provide for the flow of hot gases from the chamber and through said holes of said tubes on to the inner surfaces of the forward edges of all the intake spokes, the distributor casing having a second communication with the interior of said inlet guide vanes so as to provide for the simultaneous flow of hot gases from the chamber to the interiors of the inlet guide vanes, and pipes connecting the casing to the junction chamber, the pipe providing for the simultaneous flow of hot gases from the distributor casing through the junction chamber to the interior surface of the nose bullet, whereby the hot gases delivered to the distributor casing are simultaneously distributed in parallel paths directly to the interiors of the intake spokes, guide vanes and nose bullet.

7. An anti-icing system, for an aircraft gas turbine engine comprising an axial flow compressor, the system including hollow air intake spokes, hollow air inlet guide vanes, and a hollow nose bullet, the intake spokes being upstream of the guide vanes but downstream of the nose bullet, said intake spokes having forward edges, respective tubes within said intake spokes, said tubes being parallel with said forward edges of said spokes and spaced therefrom, said tubes provided with lateral holes facing said forward edges, an internal distributor casing supported by radially inner ends of the intake spokes, said distributor casing supporting the nose bullet and the guide vanes and providing a chamber to which hot gases are delivered; the distributor casing, communicating with said tubes and inlet guide vanes, so as to provide for the simultaneous flow in parallel paths of hot gases from the chamber directly to the interiors of the inlet guide vanes and through said holes of said tubes on to the inner surfaces of the forward edges of all the intake spokes, and pipes connecting the casing also to said hollow nose bullet, the pipes providing for the simultaneous flow of hot gases in another parallel path from the distributor casing directly to the interior surface of the nose bullet.

8. An anti-icing system according to claim 1 additionally comprising a baffle within each spoke, each baffle being positioned rearwardly of the tube contained by the spoke and forming a partition within the latter, and each spoke having forwardly of its contained baffle a series of discharge holes extending longitudinally along each side.

9. A system according to claim 8, and in which the ends of each of said tubes are supported by struts extending forwardly from the baffle but not as far as the leading edge of the spoke, the latter having on each side discharge holes at its ends which are disposed between the leading edge of the spoke and the baffle.

References Cited in the file of this patent

UNITED STATES PATENTS

| | | |
|---|---|---|
| 2,447,095 | Schmidt | Aug. 17, 1948 |
| 2,474,258 | Kroon | June 28, 1949 |
| 2,514,105 | Thomas | July 4, 1950 |
| 2,556,736 | Palmatier | June 12, 1951 |
| 2,599,470 | Meyer | June 3, 1952 |
| 2,625,010 | Clark | Jan. 13, 1953 |
| 2,634,049 | Hodges | Apr. 7, 1953 |
| 2,712,727 | Morley et al. | July 12, 1955 |
| 2,746,671 | Newcomb | May 22, 1956 |
| 2,800,273 | Wheatley et al. | July 23, 1957 |

FOREIGN PATENTS

| | | |
|---|---|---|
| 261,232 | Great Britain | Nov. 18, 1926 |
| 629,044 | Great Britain | Sept. 9, 1949 |
| 637,598 | Great Britain | May 24, 1950 |
| 671,228 | Great Britain | Apr. 30, 1952 |
| 676,314 | Great Britain | July 23, 1952 |